(12) United States Patent
Goetsch et al.

(10) Patent No.: US 8,142,580 B1
(45) Date of Patent: Mar. 27, 2012

(54) PROCESS FOR ADSORBING NITROGLYCERINE FROM WATER STREAMS USING NITROCELLULOSE

(75) Inventors: Duane A. Goetsch, Andover, MN (US); Steve J. Schmit, Elk River, MA (US)

(73) Assignee: G.D.O. Inc, Elk River, MN (US)

( * ) Notice: Subject to any disclaimer, the term of this patent is extended or adjusted under 35 U.S.C. 154(b) by 0 days.

(21) Appl. No.: 12/387,584

(22) Filed: May 5, 2009

Related U.S. Application Data

(60) Provisional application No. 61/050,440, filed on May 5, 2008.

(51) Int. Cl.
  $C06B\ 45/28$ (2006.01)
  $C06B\ 25/30$ (2006.01)
  $C06B\ 25/24$ (2006.01)
  $D03D\ 23/00$ (2006.01)
  $D03D\ 43/00$ (2006.01)

(52) U.S. Cl. ........... 149/10; 149/95; 149/97; 149/108.4; 149/109.4; 149/109.6; 149/124

(58) Field of Classification Search ............... 149/10, 149/95, 97, 108.4, 109.4, 109.6, 124
See application file for complete search history.

(56) References Cited

U.S. PATENT DOCUMENTS

| | | | | |
|---|---|---|---|---|
| 1,924,465 A | * | 8/1933 | Teeple, Jr. | 149/96 |
| 4,730,534 A | * | 3/1988 | Dupont | 86/20.12 |
| 5,430,229 A | * | 7/1995 | Voss | 588/319 |
| 6,066,214 A | * | 5/2000 | Comfort | 149/19.4 |

* cited by examiner

Primary Examiner — James McDonough
(74) Attorney, Agent, or Firm — Henry E. Naylor

(57) ABSTRACT

A process for the adsorption of nitroglycerine from aqueous streams using nitrocellulose as the adsorbent.

14 Claims, 2 Drawing Sheets

PROCESS FOR ADSORBING NITROGLYCERINE FROM WATER STREAMS USING NITROCELLULOSE

CROSS REFERENCE TO RELATED APPLICATIONS

This application is based on Provisional Application No. 61/050,440 filed May 5, 2008.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A "MICROFICHE APPENDIX"

Not Applicable

BACKGROUND

1. Field of the Invention

The present invention relates to a process of removing nitroglycerine from aqueous streams with the simultaneous generation of a component for a slurry explosive comprised of nitroglycerine and nitrocellulose.

2. Description of Related Art

The United States military regularly destroys a significant amount of munitions, including propellants, for reasons ranging from the high cost of security and storage to the fact that older munitions and propellants deteriorate over time.

In the past, munitions stocks have been disposed of by open burn/open detonation (OBOD) methods or by incineration. OBOD methods were the most inexpensive and technologically simple disposal methods available. Although such methods can effectively destroy munitions, they fail to meet the challenge of minimizing waste by-products in a cost effective manner. Furthermore, such methods of disposal are undesirable from an environmental point of view because they contribute to the pollution of the environment. For example, OBOD technology produces relatively high levels of $NO_x$, acidic gases, particulates, and metal waste. Incomplete combustion products can also leach into the soil and contaminate ground water from the burning pits used in open burn methods. The surrounding soil and ground water must often be remediated after OBOD to meet environmental guidelines. Conventional incineration methods can also be used to destroy munitions, but they require a relatively large amount of fuel. They also produce a significant amount of gaseous effluent that must be treated to remove undesirable components before it can be released into the atmosphere. Thus, OBOD and incineration methods for disposing of munitions become impractical owing to increasingly stringent federal and state environmental protection regulations. Further, today's even stricter environmental regulations require that new munitions and weapon system designs incorporate demilitarization processing issues. Increasingly stringent EPA regulations will not allow the use of OBOD or excessive incineration techniques, so new technologies must be developed to meet the new guidelines.

Accordingly, there is a need in the art for a cost effective method of demilitarizing munitions and weapons that is also environmentally safe.

SUMMARY

In accordance with the present invention, there is provided a method for removing nitroglycerine from an aqueous stream. The method comprises conducting an aqueous stream containing nitroglycerine to an adsorption zone. In the adsorption zone, the aqueous stream contacts a nitrocellulose containing material which contains nitrocellulose particles, at an effective flow rate and at an effective temperature. The result of the aqueous stream contacting the nitrocellulose containing material is that the nitroglycerine in the aqueous stream is adsorbed onto the nitrocellulose material. The result of the method of the present invention is a substantially nitroglycerine-free aqueous stream. The method of the present invention also comprises separating the substantially nitroglycerine-free aqueous stream from the nitrocellulose containing material, which now has nitrocellulose particles with nitroglycerine adsorbed thereon.

In a preferred embodiment, the aqueous stream may be conducted through the adsorption zone multiple times.

DESCRIPTION OF THE DRAWINGS

These and other features, aspects, and advantages of the present invention will become better understood with regard to the following description, appended claims, and accompanying drawings where:

DETAILED DESCRIPTION

The present invention relates to a process for removing nitroglycerine from aqueous streams using a nitrocellulose-containing material to adsorb the nitroglycerine from the aqueous stream. The aqueous stream treated in accordance with the present invention can contain up to about 1% nitroglycerine by weight. It will be understood that such aqueous streams can also contain minor amounts of other ingredients, including but not limited to: nitroguanidine; stabilizers, such as ethyl centralite, 2-nitrodiphenylamine, and diphenylamine; plasticizers, such as dibutyl phthalate and cryolite; and flash suppressants, such as potassium sulfate, and potassium nitrate. The level of these ingredients in the aqueous stream is dictated by solubility and temperature and can be as high as about 5 wt. %. Although it is preferred that nitrocellulose-containing material be substantially all nitrocellulose, it will also be understood that the nitrocellulose-containing material can contain other ingredients, including but not limited to: stabilizers such as ethyl centralite, 2-nitrodiphenylamine, and diphenylamine; and plasticizers such as dibutyl phthalate. The concentrations of these ingredients in the nitrocellulose-containing material are typically less than about 5 wt. %. Further, the nitrocellulose material can be in any suitable shape or form including, but not limited to, particulate form, pellets, spheres, and sticks. The nitrocellulose material of the present invention preferably comprises nitrocellulose particles between about 10 and about 5000 microns. The result of the process of the present invention is an aqueous stream substantially free of nitroglycerine and a double-base propellant component comprised of nitrocellulose and nitroglycerine. This double base propellant has commercial use, such as in blasting gels and in slurry explosives.

Figure 2:
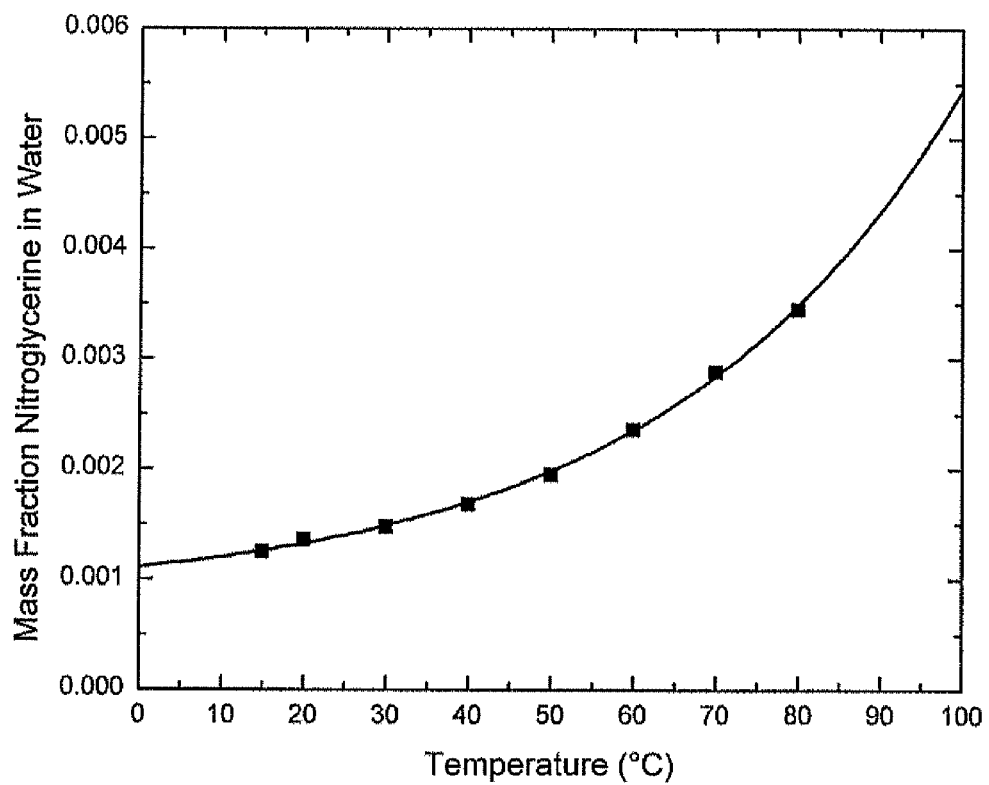
FIG. 2 is a solubility chart showing the solubility of nitroglycerine in water for temperatures from 0° C. to 100° C.

The aqueous stream containing nitroglycerine is conducted to an adsorption zone, wherein it comes into contact with the nitrocellulose material. As used in this description and the appended claims, the term "nitrocellulose material" means any solid material containing at least about 50 wt. %, preferably at least about 80 wt. %, more preferably at least about 90 wt. %, and most preferably at least about 95 wt. % nitrocellulose. An ideal nitrocellulose material is one that is comprised of substantially all nitrocellulose. The remainder of material, if any, is not deleterious to the instant process. In a preferred embodiment of the present invention, the nitrocellulose containing material is in an impure form, such as a spent single base propellant. As used in this description and the appended claims, the term "spent single base propellant" means a single base propellant that is no longer suitable for propellant use because of such things as instability or obsolescence. The nitrocellulose-containing material may also contain relatively small amounts of nitroglycerine that will typically remain with the nitrocellulose when processing double-base and triple-base propellants. If the nitrocellulose-containing material also contains nitroglycerine, the nitrocellulose in the nitrocellulose-containing material can be up to about 90 wt. % of the saturated limit of nitroglycerine on nitrocellulose under the present process conditions. It is preferred that the nitrocellulose material not contain more than about 50 wt. %, more preferably no more than about 30 wt. % of said saturation limit. The temperature at which the adsorption is operated will be at an effective temperature. Effective temperature, as used herein is a temperature at which the aqueous stream does not become over saturated with nitroglycerine and result in the precipitation of nitroglycerine from solution. Thus, once the nitroglycerine is in solution, it is preferred that the temperature not fall below the temperature at which the nitroglycerine will start to precipitate from solution. Precipitation of nitroglycerine from solution can lead to serious safety hazards during processing. At atmospheric pressure, the temperature will typically have to be kept about 100° C. Higher temperatures can be utilized if the system is operated under pressure. Any temperature and pressure combination may be used as long as the nitroglycerine dissolved in the aqueous stream does not phase separate. FIG. 2 hereof shows the solubility of nitroglycerine in water at various temperatures. The pressure used will be dependent on the temperature. Additionally, the flow rate at which the adsorption is performed will be at an effective flow rate. The effective flow rate is a flow rate at which the nitrocellulose particles become saturated with nitroglycerine at a reasonable period of time. Slower flow rates are preferred so that the adsorption bed can achieve larger capacities and approach equilibrium. In a preferred embodiment of the invention, the superficial velocity of the liquid is less than 100 bed volumes/hour.

Figure 1:
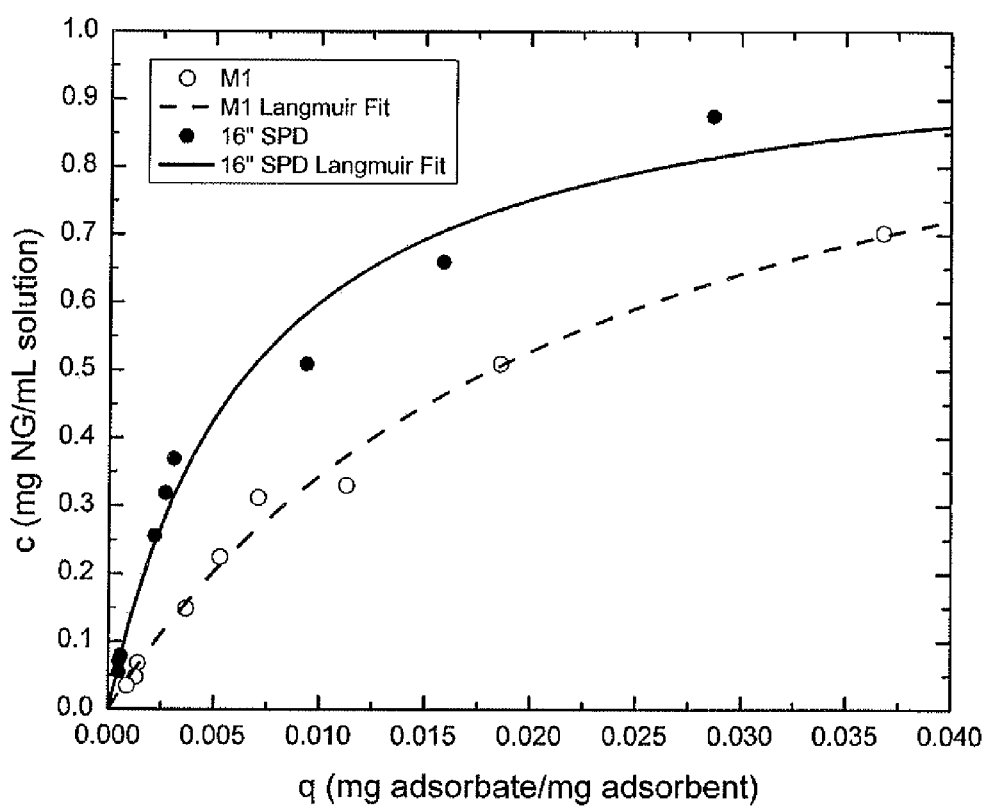
FIG. 1 is an adsorption isotherm for nitroglycerine in water with single base propellants. This figure shows the adsorption isotherm for nitroglycerine in water on two different types of single-base propellant (nitrocellulose) at 25° C. The Langmuir nature of these curves suggests favorable adsorption and indicates single-base propellant (nitrocellulose) can be used to remove the nitroglycerine from water by passing the fluid over the adsorbent nitrocellulose.

After adsorption, the treated aqueous stream will be substantially free of nitroglycerine. In a preferred embodiment of the present invention, at least 60 wt. % of the nitroglycerine in the aqueous stream is adsorbed onto the nitrocellulose material. More preferred, at least 80 wt. % and most preferably at least about 95 wt. % of the nitroglycerine in the aqueous stream is adsorbed onto the nitrocellulose-containing material. In a preferred embodiment of the invention the substantially nitroglycerine-free aqueous stream contains less than about 1 part per million nitroglycerine. As shown in FIG. 1 herein, the adsorption process results in nitroglycerine being adsorbed to nitrocellulose, which results in a double base propellant material comprising nitroglycerine and nitrocellulose. The nitrocellulose particles containing nitroglycerine adsorbed thereon can then be used to prepare slurry propellants or sold commercially as a double base propellant component.

The adsorption zone can be of any suitable reactor type. Non-limiting examples include fixed bed reactors, slurry bed reactors, moving bed reactors and ebullating bed reactors. If fixed bed reactors are used it is preferred that they be arranged so that when one bed is in service another is being emptied of saturated nitrocellulose material and refilled with fresh nitrocellulose material. More preferred is a moving bed reactor because the reactor does not have to be taken out of service to remove the saturated nitrocellulose material. Fresh nitrocellulose material is continually added as saturated nitrocellulose material is removed from the reactor. The moving bed reactor can be either a co-current flow or counter-current flow. A counter-current flowing moving bed reactor is preferred because a smaller reactor can be used.

EXAMPLE 1

The adsorption isotherms in FIG. 1 are shown for two different types of nitrocellulose. The adsorption isotherms were collected by contacting nitroglycerine-laden water with powdered nitrocellulose in a constant-temperature bath held at 25° C. for 72 hours to obtain equilibrium conditions. After equilibrium was obtained, the concentration of the nitroglycerine in the water was measured via high performance liquid chromatography.

For each of the two types of nitrocellulose, nine different mixtures were prepared. Each of the mixtures used water with a varying amount of nitroglycerine present. $[NG]_0$ in the Table below indicates the amount of nitroglycerine originally present in the mixture. In addition, the mass of nitrocellulose was varied so that the ratio of the initial concentration of nitroglycerine in the water to the mass of nitrocellulose was different for all nine of the samples. The table below summarizes the data used to generate the isotherm in FIG. 1.

| | M1 | | |
|---|---|---|---|
| Sample | $[NG]_0$ mg/mL | $[NG]_f$ mg/mL | Propellant Mass g |
| 1 | 1.4515 | 0.7023 | 0.1017 |
| 2 | 1.4515 | 0.5094 | 0.2538 |
| 3 | 1.4515 | 0.3302 | 0.4981 |
| 4 | 0.4147 | 0.3119 | 0.1009 |
| 5 | 0.4147 | 0.2245 | 0.2490 |
| 6 | 0.4147 | 0.1486 | 0.4993 |
| 7 | 0.0854 | 0.0681 | 0.1069 |
| 8 | 0.0854 | 0.0477 | 0.2506 |
| 9 | 0.0854 | 0.0346 | 0.4996 |

| 16" SPD |||| 
|---|---|---|---|
| Sample | $[NG]_0$ mg/mL | $[NG]_f$ mg/mL | Propellant Mass g |
| 10 | 1.4515 | 0.8749 | 0.1004 |
| 11 | 1.4515 | 0.6595 | 0.2494 |
| 12 | 1.4515 | 0.5088 | 0.5000 |
| 13 | 0.4147 | 0.3691 | 0.1013 |
| 14 | 0.4147 | 0.3189 | 0.2518 |
| 15 | 0.4147 | 0.2556 | 0.5016 |
| 16 | 0.0854 | 0.0785 | 0.0993 |
| 17 | 0.0854 | 0.0706 | 0.2492 |
| 18 | 0.0854 | 0.0550 | 0.5056 |

The previously described versions of the present invention have many advantages, including the cost effective generation of a double base propellant without the generation of any waste by-products. The present invention is cost effective because it removes a contaminant from an aqueous stream and generates a commercial product. The process is environmentally safe because there is no production of waste by-products. Additionally, no further remediation of the aqueous stream is needed if nitroglycerine is the only contaminant present in the aqueous stream before treatment. An additional advantage is that nitroglycerine is removed from aqueous streams without the use of incineration techniques which require a large amount of fuel and the treatment of the gaseous effluent generated by incineration techniques.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for removing nitroglycerine from an aqueous stream, the method comprising:
    a. conducting an aqueous stream containing nitroglycerine to an adsorption zone wherein the aqueous stream contacts a nitrocellulose containing material wherein nitroglycerine is adsorbed onto the nitrocellulose, resulting in a substantially nitroglycerine-free aqueous stream and a nitrocellulose containing material containing nitroglycerine adsorbed thereon from said aqueous stream;
    b. separating said substantially nitroglycerine-free aqueous stream from the nitrocellulose containing material having nitroglycerine adsorbed thereon.

2. The method of claim 1 wherein the adsorption zone is a multiple bed system.

3. The method of claim 1 wherein the adsorption zone is a moving bed reactor.

4. The method of claim 3 wherein the moving bed reactor is co-current flow.

5. The method of claim 3 wherein the moving bed reactor is counter-current flow.

6. The method of claim 1 wherein the adsorption zone is a fixed bed.

7. The method of claim 1 wherein the nitrocellulose containing material comprises nitrocellulose particles between 10 and 5000 microns.

8. The method of claim 1 wherein the aqueous stream contains nitroglycerine, stabilizers and plasticizers.

9. The method of claim 1 wherein the nitrocellulose containing material is a spent single base propellant.

10. The method of claim 1 wherein the nitrocellulose particles in the nitrocellulose containing material are present at a concentration of at least 50% by weight.

11. The method of claim 1 wherein the nitrocellulose particles in the nitrocellulose containing material are present at a concentration of at least 80% by weight.

12. The method of claim 1 wherein the substantially nitroglycerine-free aqueous stream contains less than 1 part per million nitroglycerine.

13. The method of claim 1 wherein the effective temperature is less than 100 degrees Celsius.

14. The method of claim 1 wherein the nitrocellulose is contacted with said aqueous stream containing nitroglycerine multiple times until the nitrocellulose becomes saturated with nitroglycerine.

\* \* \* \* \*